(12) United States Patent
Thurlow et al.

(10) Patent No.: US 7,893,680 B2
(45) Date of Patent: Feb. 22, 2011

(54) POWER CONTROL USING AT LEAST 540 DEGREES OF PHASE

(75) Inventors: Barry J. Thurlow, Luton (GB); Duncan I. Stevenson, St. Albans (GB); Scott M. Potter, Welwyn Garden City (GB); John W D. Cooper, Hitchin (GB)

(73) Assignee: Xerox Corporation, Norwalk, CT (US)

( * ) Notice: Subject to any disclaimer, the term of this patent is extended or adjusted under 35 U.S.C. 154(b) by 1661 days.

(21) Appl. No.: 10/974,213

(22) Filed: Oct. 27, 2004

(65) Prior Publication Data

US 2006/0097758 A1 May 11, 2006

(51) Int. Cl.
*G05F 5/00* (2006.01)
(52) U.S. Cl. .................................. 323/300; 323/323
(58) Field of Classification Search .............. 323/320, 323/300, 323, 322
See application file for complete search history.

(56) References Cited

U.S. PATENT DOCUMENTS

| 4,617,508 | A | * | 10/1986 | Bloomer | 323/237 |
|---|---|---|---|---|---|
| 4,633,161 | A | * | 12/1986 | Callahan et al. | 323/242 |
| 4,975,629 | A | * | 12/1990 | Callahan et al. | 323/235 |
| 5,004,969 | A | * | 4/1991 | Schanin | 323/235 |
| 5,483,149 | A | * | 1/1996 | Barrett | 323/300 |
| 5,498,946 | A | * | 3/1996 | Plumer et al. | 318/809 |
| 5,687,297 | A | | 11/1997 | Coonan et al. | |
| 6,069,624 | A | | 5/2000 | Dash et al. | |
| 6,703,818 | B2 | * | 3/2004 | Amels et al. | 323/320 |

* cited by examiner

*Primary Examiner*—Shawn Riley
(74) *Attorney, Agent, or Firm*—Oliff & Berridge, PLC

(57) ABSTRACT

A circuit and method for generating an electrical alternating current power signal in which the alternating current signal is dropped once at a non-zero crossing point in every 540 plus N degrees, where N is a non-negative number. This manner of controlling power to a device enables wide ranges of power control while generating acceptable levels of power line harmonics and while conforming to existing international regulations governing voltage variations.

11 Claims, 7 Drawing Sheets

| PATTERN | 1 | 2 | 3 | 4 | 5 | 6 | 7 | LENGTH | ON % | % Vrms | POWER % | MAX OFF HALF CYCLES | NEAREST 10% |
|---|---|---|---|---|---|---|---|---|---|---|---|---|---|
| 10 | | | | | | | | 3 | 100% | 100% | 100% | | 100% |
| 9 | 0 | 1 | 1 | 1 | 1 | 1 | 1 | 7 | 86% | 93% | 89% | 1 | 90% |
| 8 | | | | | 1 | 1 | 1 | 5 | 80% | 89% | 84% | 1 | 80% |
| 7 | | | 1 | 1 | 0 | 1 | 1 | 3 | 67% | 82% | 73% | 1 | 70% |
| 6 | 0 | 1 | 0 | 1 | 0 | 1 | 1 | 7 | 57% | 76% | 65% | 1 | 60% |
| 5 | | | 0 | 1 | 0 | 1 | 0 | 7 | 43% | 65% | 43% | 2 | 50% |
| 4 | | | 0 | 0 | 0 | 1 | 1 | 3 | 33% | 58% | 43% | 2 | 40% |
| 3 | 0 | 1 | 0 | 0 | 0 | 0 | 1 | 5 | 20% | 45% | 29% | 4 | 30% |
| 2 | 0 | 0 | 0 | 0 | 0 | 0 | 1 | 7 | 14% | 38% | 22% | 4 | 20% |
| 0 | 0 | 0 | 0 | 0 | 0 | 0 | 0 | 7 | 0% | 0% | 0% | 6 | 0% |

FIG. 3

| WAVE FORM DESCRIPTION | MEASURED Pst VALUE |
|---|---|
| CYCLE STEALING PATTERNS OVER 9 HALF-CYCLES | 1.5 |
| CYCLE STEALING PATTERNS OVER 8 HALF-CYCLES | 0.95 |
| 540 DEGREE PHASE CONTROL | 0.66 |
| INTERLEAVED 9 PATTERNS OF 8 HALF-CYCLES | 0.85 |
| CONVENTIONAL 180 DEGREE PHASE CONTROL | 0.51 |

FIG. 6

POWER CONTROL USING AT LEAST 540 DEGREES OF PHASE

BACKGROUND AND SUMMARY

The present invention relates to selection of AC power phases and waveform control in order to select a waveform that optimizes delivered power within acceptable power and flicker limits.

A frequent issue in providing electric power to a device is control of the power provided to the device. Voltage can be decreased with simple resistors. Transformers can modulate between increased voltage and decreased current or vice versa. For devices that require varying amounts of power depending upon application, however, manipulation of the AC current waveform is a preferred method. Devices such as the heating lamps inside fuser rolls of electrostatographic printers are such an application. For fast warm-up cycles and during periods in which much heat is drawn from a fuser because of rapid printing speeds, full power drawn from an AC power source is desired. During non-imaging but machine-on periods, only power sufficient to maintain fuser temperature within a desired range is required. Little heat is drawn from the fuser during such periods. Diminished power can be accomplished by dropping out a major portion of the sinusoidal AC power signal in a manner to be described below. As printing frequency increases, more power needs to be applied in order to maintain the fuser at desired fusing temperatures. This increase in power can be accomplished by adding back portions of the AC power signal that were dropped during lower power periods.

Dropping out portions of the sinusoidal AC power signal is conventionally accomplished by phase control or cycle stealing methods. Conventional phase control acts over one half-cycle (180 degrees of the cycle) in a manner such as shown in FIG. 1. An essentially infinitesimal amount of a phase can be dropped, thereby enabling fine tuning of the amount of power reaching a device. Conventional cycle stealing enables the dropping of whole half cycles in a sequence of N half cycles as shown in FIG. 2. In conventional cycle stealing, each of the drops commences only at the zero crossing points, thereby offering only N different power levels. In order to avoid imparting a DC-offset, conventional cycle stealing utilizes an odd number of half-cycles and typically uses patterns of 3-half cycles, or 540 degrees.

Both conventional phase control and cycle stealing present problems depending upon particular applications. For conventional phase control, problems arise because the switching, or dropping of the signal, occurs every 180 degrees at points other than the zero crossing points. The result is harmonic current emissions in every half cycle (180 degrees). The harmonic current emissions are due to the non-zero crossing which induce secondary signals, or harmonics, sent back through the power lines. Where the power line is a public supply source such as a utility line, or mains, regulations place limits on the amount of harmonic emissions permitted by any device. With conventional phase control, these limits are easily exceeded. For conventional cycle stealing, several problems similarly result. First, as explained above, only N (typically 3 levels) of power are permissible, e.g. 0%, 33.3%, 66.67%, and 100%. Conventional cycle stealing is accordingly relatively inflexible and does not permit fine tuning of delivered power. Secondly, some modes of cycle stealing (particularly as N is made larger) cause voltage variation in the mains, which, in turn causes some light sources to appear to flicker as detected by the human eye. For instance, the second waveform shown in FIG. 2 drops 2 out of every 3 half-cycles, thereby yielding a 33% "on" signal. The two half-cycles in which the signal is "off" provides sufficient time for a typical lamp filament such as tungsten to cool significantly. The result is that when an "on" half cycle resumes, the filament has significantly less resistance, and an in-rush spike in current is created and a voltage fluctuation is sent down the mains. Such fluctuations in voltage affect light sources and other devices connected to the mains. The human eye is particularly sensitive to variations in light and particularly when the flicker is in a range nearing 8 Hertz. As a result of the above, human-detectable fluctuations of light caused by voltage artifacts introduced by devices is called "flicker" and is regulated in many jurisdictions.

A refinement to simple and conventional cycle stealing and phase control is pattern switching control methods exemplified by the sequences shown in FIG. 3. Such pattern switching control methods combine patterns of cycle stealing to obtain the relatively fine power control lacking with simple conventional cycle stealing. However, flicker problems persist. Each of the patterns labeled 2-5 in FIG. 4 contain two or more dropped half cycles. The result, as explained above, is a cooling of lamp filaments resulting in lowered resistance which, in turn, results in increases inrush current and flicker. The flicker introduced by some patterns is more noticeable than that introduced by other patterns because of the frequency of dropped double cycles. Pattern 4, which resembles simple cycle stealing, introduces the most noticeable flicker.

Another factor in designing controlled power circuits for devices is the power factor, defined as kW/kVA, where kW is the actual load power used by a device and kVA is the apparent load power as measured from the supply. The power factor of a signal is not particularly relevant for devices that require relatively little power. Where, however, devices require access to virtually all power that is available from the mains, the power factor becomes important. Available power is a function of current (I) multiplied by voltage (V). For simple AC current, the function is I multiplied by the root mean square voltage (RMS) as supplied. Current (I) is determined by the capacity of the supply. The maximum voltage (V) is also determined by the supply. As described above, however, methods of varying power by cycle stealing, phase control, pattern switching, chopping peak voltages, or similar methods all reduce power received by the device by dropping a portion of the AC signal. Since the full AC signal (kVA) is undiminished, such reduced actual load power (kW) used by the device reduces the power factor.

For devices which require high power factors, such as modern high speed printers, it is desired to provide a means for modulating the AC power signal to provide fine control of the power received by the device, minimize signal artifacts such as harmonics and flicker, while providing a relatively high power factor to ensure efficient use of the power supplied. Also, for energy conservation purposes, high power factors are desired.

One embodiment of the invention is an electrical signal carrying power for a device, comprising an alternating current waveform in which the waveform signal is dropped once at a non-zero crossing point in every 540 degrees.

Another embodiment of the invention is an electrical signal carrying power for a device, comprising an alternating current waveform in which the waveform signal is dropped once at any point in every 540 plus N times 180 degrees, where N is any non-negative number.

Another embodiment of the invention is a circuit for controlling the level of power delivered to a device, comprising: a zero crossing detector; a timing circuit; a combinatorial logic device that receives input from the zero crossing detector and the timing circuit; and a power switch for opening and closing the output signal in response to signals from the combinatorial logic device; wherein the output from the circuit is an alternating current waveform comprised of an alternating current waveform in which the waveform signal is dropped once at a non-zero crossing point in every 540 degrees.

Yet another embodiment of the invention is a method for controlling levels of alternating current electrical power delivered to a device, comprising: sensing, with a zero crossing detector, the time at which the alternating current signal comprises zero voltage; counting the alternating current half cycles; determining the phase angle that corresponds to the desired level of power within 540 plus N times 180 degrees, where N in any non-negative integer and where one phase angle corresponds to a non-zero crossing point; computing a time from a zero crossing point to the determined phase angle; and dropping the alternating current voltage at the determined phase angle once within the 540 plus N times 180 degrees.

BRIEF DESCRIPTION OF THE DRAWINGS

FIG. 3 is chart describing prior art pattern switching control methods.

FIG. 6 is a chart of Pst values for various waveforms.

DETAILED DESCRIPTION

Figure 1:
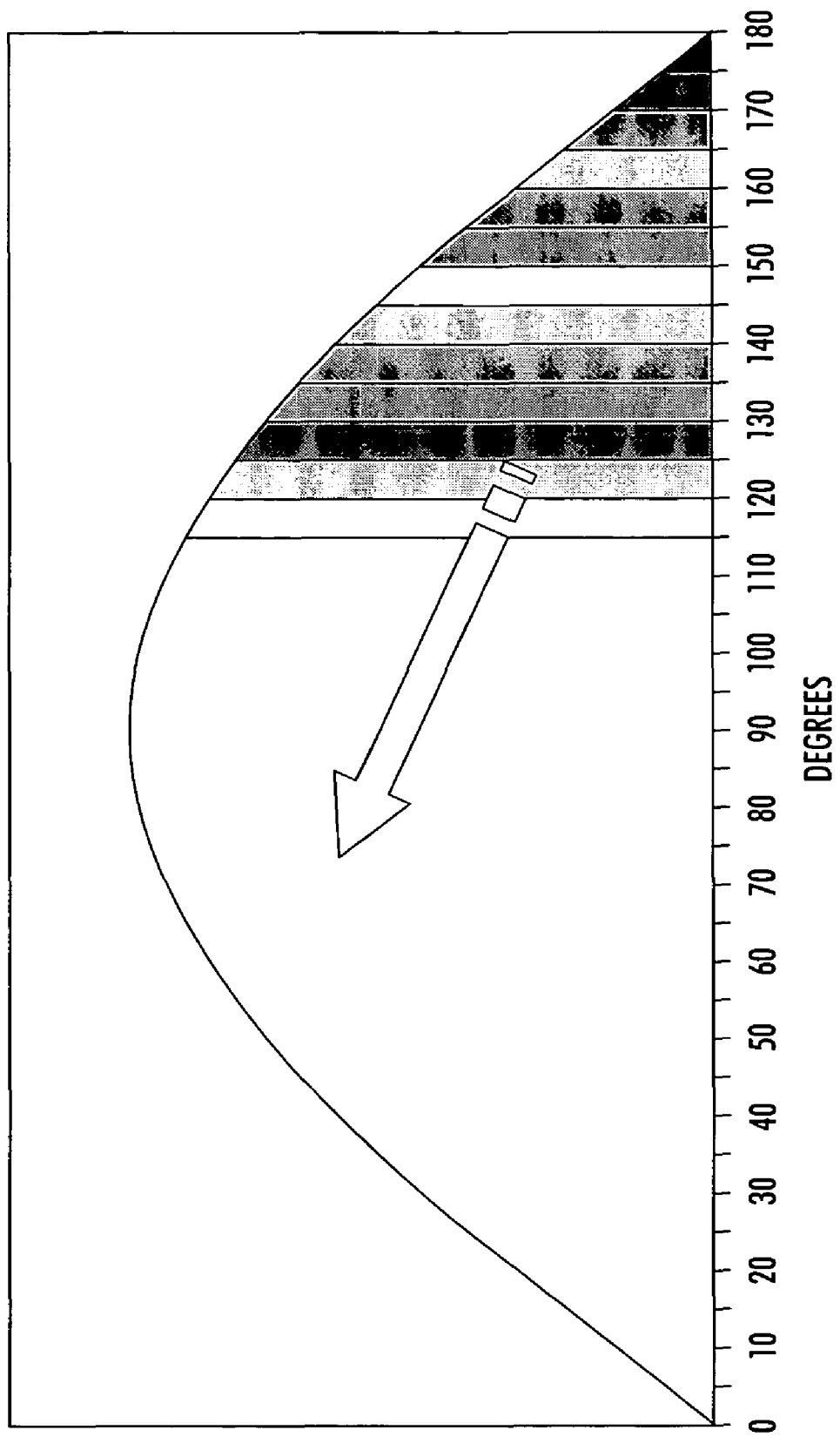
FIG. 1 is a graph showing the 180 degrees of a half-cycle and the ability to select amounts of phase control.

For a general understanding of the present invention, reference is made to the drawings. In the drawings, like reference numerals have been used throughout to designate identical elements.

An exemplary electronic system comprising one embodiment of the present invention is a multifunctional printer with print, copy, scan, and fax services. Such multifunctional printers are well known in the art and may comprise print engines based upon ink jet, electrostatography, and other imaging devices. The general principles of electrostatographic imaging are well known to many skilled in the art as exemplified by electrophotography. Generally, the process of electrophotographic reproduction is initiated by substantially uniformly charging a photoreceptive member, followed by exposing a light image of an original document thereon. Exposing the charged photoreceptive member to a light image discharges a photoconductive surface layer in areas corresponding to non-image areas in the original document, while maintaining the charge on image areas for creating an electrostatic latent image of the original document on the photoreceptive member. This latent image is subsequently developed into a visible image by a process in which a charged developing material is deposited onto the photoconductive surface layer, such that the developing material is attracted to the charged image areas on the photoreceptive member. Thereafter, the developing material is transferred from the photoreceptive member to a copy sheet or some other image support substrate to which the image may be permanently affixed for producing a reproduction of the original document. In a final step in the process, the photoconductive surface layer of the photoreceptive member is cleaned to remove any residual developing material therefrom, in preparation for successive imaging cycles.

The above described electrophotographic reproduction process is well known and is useful for both digital copying and printing as well as for light lens copying from an original. In many of these applications, the process described above operates to form a latent image on an imaging member by discharge of the charge in locations in which photons from a lens, laser, or LED strike the photoreceptor. Such printing processes typically develop toner on the discharged area, known as DAD, or "write black" systems. Light lens generated image systems typically develop toner on the charged areas, known as CAD, or "write white" systems. Embodiments of the present invention apply to both DAD and CAD systems. Since electrophotographic imaging technology is so well known, further description is not necessary. See, for reference, e.g., U.S. Pat. No. 6,069,624 issued to Dash, et al. and U.S. Pat. No. 5,687,297 issued to Coonan et al., both of which are hereby incorporated herein by reference. As electrophotographic systems print with increasing speeds, more power is consumed by the system's fusing sub-system. A high power factor is desired while allowing fine control of the fuser and conformance with regulations governing dysfunctional signal artifacts such as harmonics and flicker.

Figure 4:
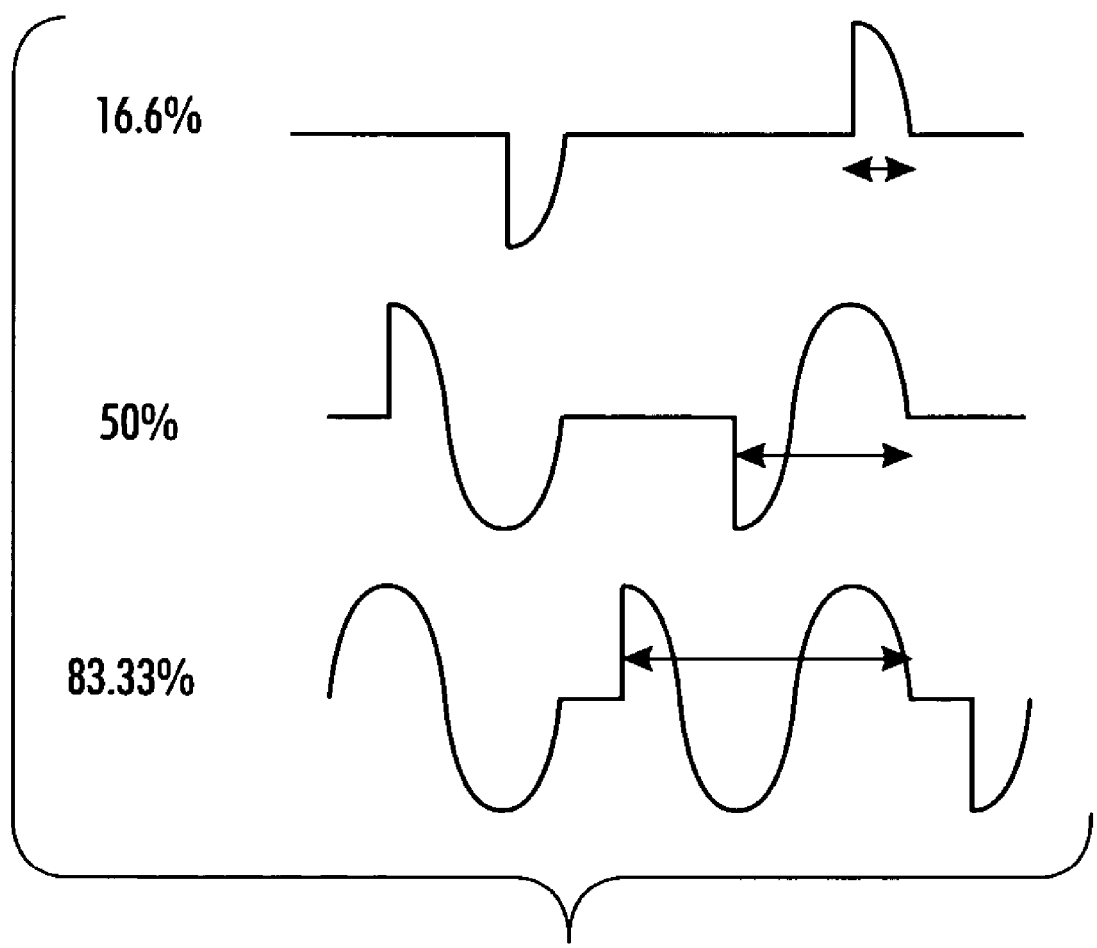
FIG. 4 is a graph showing 3 possible waveform embodiments of the present invention.

Referring to FIG. 4, several embodiments of an AC power waveform of the present invention are shown. The waveform is similar to conventional phase control in that switching occurs at non-zero points. Also, similarly to conventional phase control, the waveform enables fine power control by dropping various percentages of the waveform in a controlled manner with, conceptually, an infinite number of possible gradations. One difference between the waveforms of the present invention and those of conventional phase control is that switching occurs at a non-zero crossing only once in every 3 half-cycles but at any point in the 540 degrees. As shown above in FIG. 1, conventional phase control switches in every half-cycle. The result with the inventive waveform is that harmonics are introduced but only during one half-cycle in every three. Since the harmonics are only introduced at the switching points, the average energy of harmonics introduced in the mains is approximately one third that of a system such as conventional phase control in which switching occurs in every half-cycle. The fine control benefits of conventional phase control are thus retained while minimizing the harmonics introduced into the mains. Compared to conventional phase control, the power factor is also improved since conventional phase control reduces the power factor in every half-cycle whereas the inventive waveform reduces power over three half-cycles.

In FIG. 4, three examples of waveforms of the present invention are shown. The top waveform yields a power factor of approximately 17 percent, with "on" time of approximately the same 17 percent. The middle waveform yields a power factor of approximately 50 percent, with "on" time also approximating 50 percent. The bottom waveform yields a power factor approximately 83 percent, with "on" also approximating 83 percent. In order to prevent a DC offset and to conform to regulations regarding current management, each subsequent set of 3 half-cycles starts in the opposing phase, thereby producing a symmetrical draw on the mains. Although only 3 waveforms are shown, one skilled in the art will understand that segments of the waveform can be dropped at any point in the signal, yielding essentially an infinite amount of fine control of the power delivered to a device. In practice, most current regulatory supply devices provide discrete levels of supplied power, such as the 3 levels of power indicated in FIG. 4 or 10 levels of power approximating each 10 percent of maximum power.

As can be seen, waveforms of the present invention retain the sinusoidal waveform shape except where the signal is dropped. In Europe, nominal mains RMS voltage is 220 to about 240 RMS Volts with a permitted variance of plus or minus 10 percent. Nominal zero to peak voltage is accordingly about 311V to about 339V (1.414 times RMS voltage) plus or minus 10 percent, yielding a total range from 280V to about 373V. Negative peak to positive peak voltages are accordingly about 622V to about 679V, plus or minus 20 percent. Except for very low power levels where all peak voltages are dropped, waveform embodiments of the present invention retain one or more peak voltages.

Figure 5:
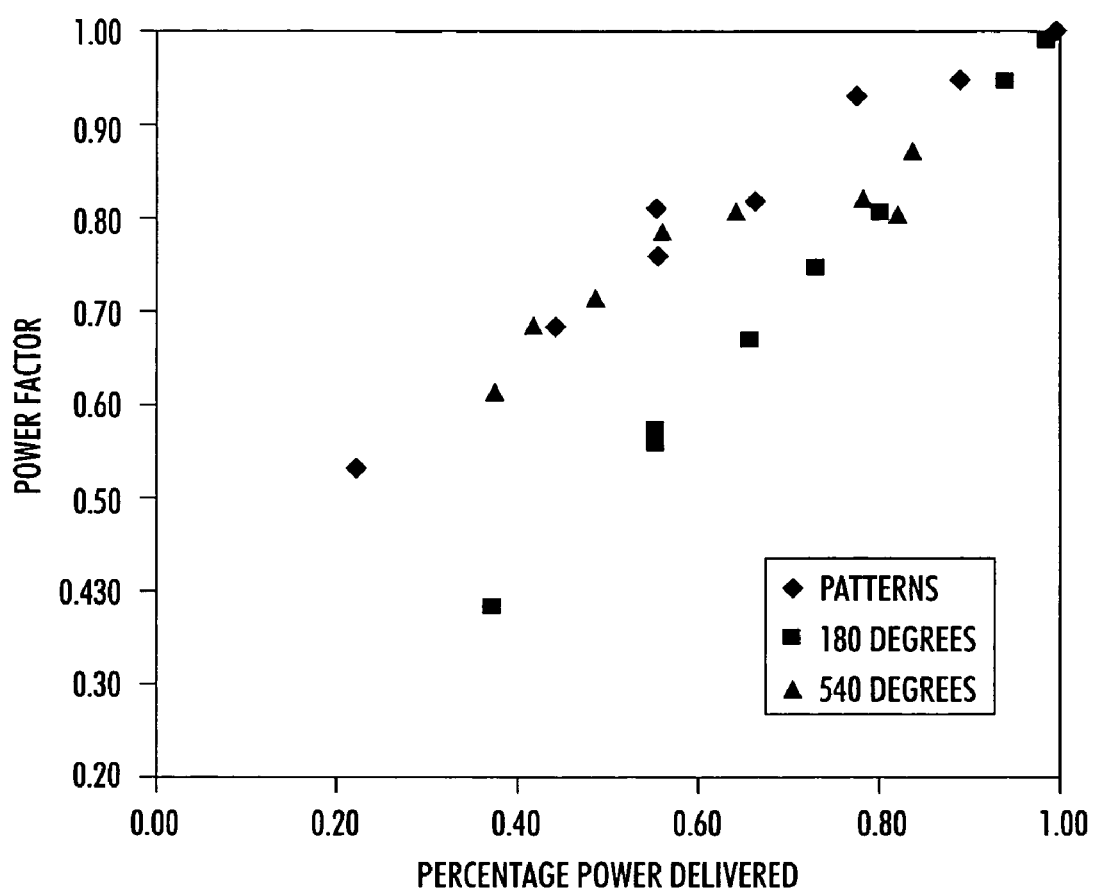
FIG. 5 is a graph showing power factor vs. power actually delivered for waveform embodiments of the present invention and for conventional 180 degree phase control and conventional pattern switching.

FIG. 5 compares the power factor to power actually delivered. The power factor/power delivered curve corresponding to conventional 180 degree phase control as shown in FIG. 1 is represented by square dots. The power factor/power delivered curve corresponding to pattern switching as shown in FIG. 3 is represented by diamonds. The power factor/power delivered curve corresponding to the 540 degree phase control embodiment of the present invention exemplified in FIG. 4 is represented by triangles. For applications such as fusers in electrostatographic printers, the most important power factor range is the middle portion of the range between a power factor ranging from approximately 0.40 to about 0.75. Within this range, the power factor/power delivered curve for the 540 degree phase control embodiment approximates that of the efficient pattern switching curve. Both 540 degree phase control and pattern switching greatly exceed the curve of the 180 degree phase control within this range, indicating superior power management and efficiency for such wave forms. Above a power factor of approximately 0.80, the curve for the 540 degree phase control becomes less efficient. This is probably due to the increasing influence of the dropped signal in the third half-cycle. As shown, at power factors above approximately 0.80, the curve for the 540 degree phase control resembles the curve for conventional 180 degree phase control.

Regulations controlling permitted flicker vary around the globe. In the United States, where 60 Hertz AC current is the norm, flicker introduced by pattern switching such as shown in FIG. 3 is generally acceptable. In Europe, however, public AC current has a 50 Hertz waveform, and such longer cycle lengths increase the apparent flicker introduced by such pattern switching as shown in FIG. 3. A method of measuring flicker and European regulatory limits are set forth in EN 61000-3-3:1995. In this standard, a measure of short term flicker is developed called Pst, which represents the flicker severity evaluated over a short period of minutes. Factors such as the magnitude and frequency of power spikes are factors in the measurement. As described above, human sensitivity to fluctuations in light is maximized at frequencies around 8 Hertz, and devices with significant magnitudes of fluctuations around this frequency receive higher scores. Pst=1 is considered the conventional threshold of flicker irritability, and devices producing Pst greater than 1 cannot be sold in Europe.

FIG. 6 presents a comparison of Pst values for power control methods in which one or more segments of a waveform are dropped over N half-cycles. Phase control patterns over 9 half-cycles gave a Pst greater than 1.5, which exceeds the legal limit in Europe. Although both a regular 8 half-cycle phase control pattern and an interleaved 8 half-cycle pattern gave Pst values less than the legal limit of 1, the values of 0.95 and 0.85 were deemed too close to the legal limit of 1 for design integrity of devices relying upon such waveforms. Of the waveform patterns tested, only conventional 180 degree phase control and the 540 degree phase control embodiment of the present invention gave Pst values safely less than the legal limit of 1.

Figure 2:
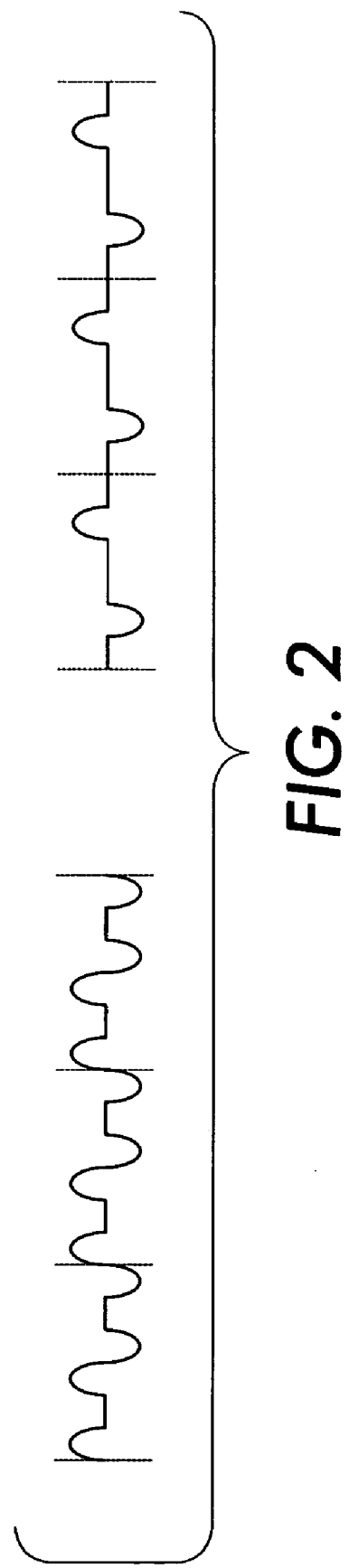
FIG. 2 is a frequency pattern of one prior art cycle stealing pattern.

As described above, conventional 180 degree phase control yields poor power factor efficiency as shown in the power factor/delivered power curves of FIG. 5. Such conventional phase control also introduces harmonics into the mains approximately 3 times the magnitude of harmonics introduced by the embodiment shown in FIG. 4. Conventional cycle stealing and pattern switching cycle stealing as shown in FIGS. 2 and 3, while minimizing or avoiding harmonics, cause unacceptable flicker problems with Pst values exceeding conservative design thresholds. Conventional cycle stealing is further disadvantaged by its relatively inflexible power controls since it allows signal dropping only at the zero points. In sum, the 540 degree phase control embodiments similar to those of FIG. 4 provide optimal trade-offs between high power efficiency and relatively low artifacts such as flicker and harmonics. Phase control embodiments comprising 540 degrees plus N multiples of 360 degrees also comprise embodiments of the present invention since each avoids a DC offset while enabling fine power control modulation and acceptable Pst values. In applications indifferent to DC bias, waveforms comprising 540 degrees plus N multiples of 180 degrees are also acceptable. In both of the above formulations, N can be any non-negative number although integer numbers would generally be used.

Figure 7:
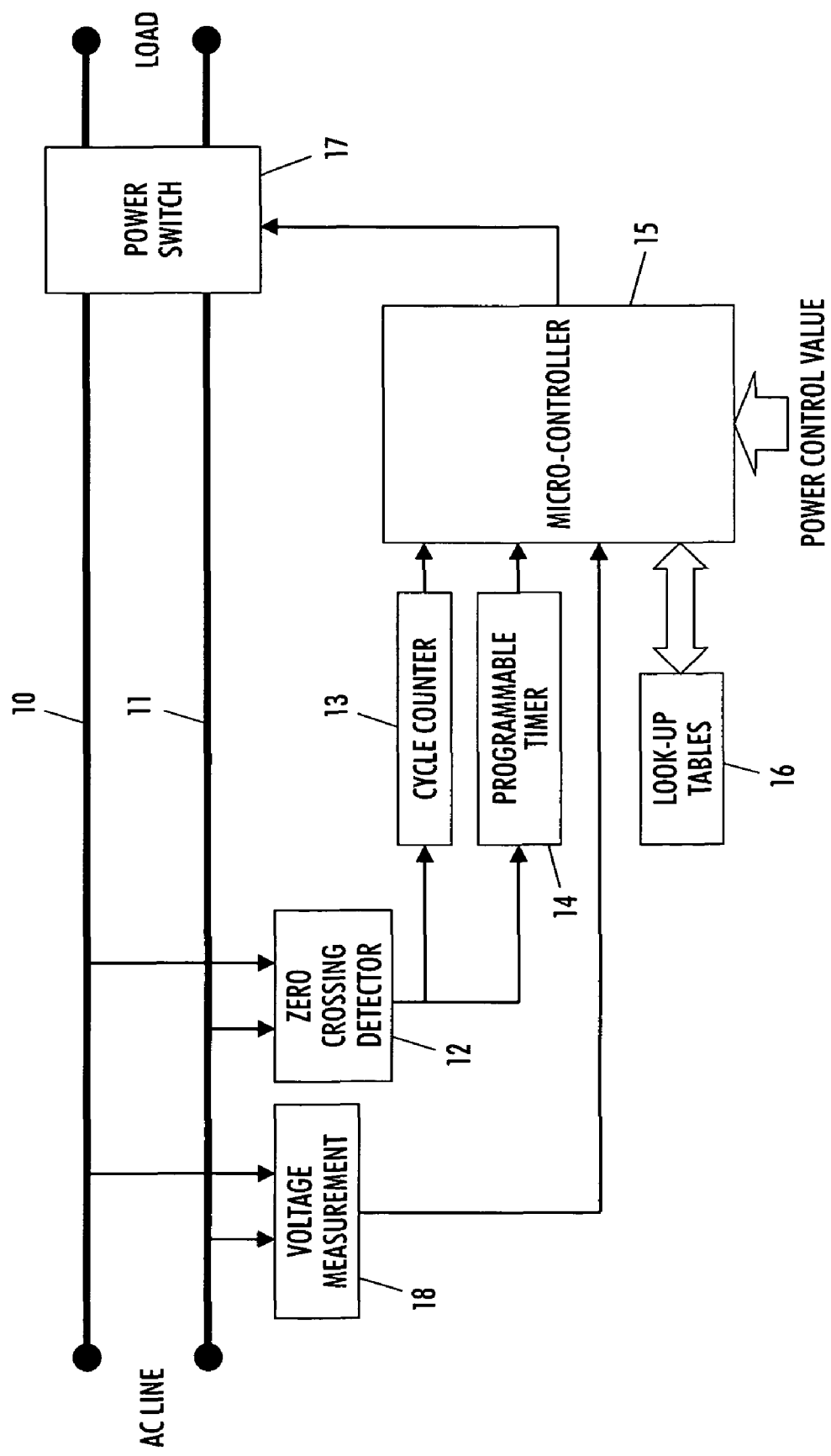
FIG. 7 is a block diagram of a circuit capable of producing waveforms of the present invention.

FIG. 7 provides a schematic drawing of a circuit capable of producing 540 degree phase control waveforms and phase control waveforms of 540 plus N multiples of 180 or 360 degrees. Line 10 represents the supply line. Line 11 represents the return line. Component 12 is a zero crossing detector, communicating with supply and return lines 10 and 11, for detecting the zero voltage crossing points of the AC line voltage. This data is fed into a cycle counter component 13 that counts the AC line half cycles based upon detection of the zero crossing points. The zero crossing data is also fed into a programmable timing component 14 with capabilities of determining the time from the zero crossing to the desired time at which the signal is to be switched This timing is effectively determined as a phase angle of the 540 degree cycle (plus N multiples of 180) of the present invention. Outputs from the cycle counter component 13 and the programmable timing component 14 are then fed into a microcontroller 15 or other combinatorial logic device with capability to combine these inputs plus an input signal setting forth the power control value pursuant to which the load device calls for an amount of power to be delivered to the fuser or other device to be powered. When combining inputs, logic device 15 may optionally refer to a look-up table or other memory component 16 that correlates different phase angles with associated levels of delivered power. Once the appropriate phase angle has been selected, logic device 15 uses information from cycle counter 13 and programmable timer 14 to determine the moment at which a signal is to be sent to power switch 17 to either open or close lines 10 and/or 11 at the moment corresponding to the appropriate phase angle. Those skilled in the art will understand that a micro-controller device 15 may combine one or more of the functions described above. In particular, cycle counter 13, zero crossing detector 12, and programmable timer 14 may all be combined within the sensor and logic circuits of a single micro-processor.

Many variations and improvements upon the above described simple circuit are possible. In particular, voltage measurement device 18 is shown measuring the voltage of both supply line 10 and return line 11. As detected line voltage varies, micro-controller 15 could use look-up table 16 or a computational means to determine how much change to the normal phase selection must be made in order to increase or decrease delivered power such that the amount actually delivered more nearly equals the amount desired. The same or similar functionality can enable the same device to maintain delivered power at desired levels whether the device is connected to US or European mains. The look-up table or look-up function with micro-controller 15 may also include an ability to compensate for the change in load resistance with load power. In the case of devices such as a fuser lamp, resistance increases rapidly with temperature. Fuser temperature rises as the lamp is turned on more frequently or for longer periods. Appropriate computations or data from the look-up table 16 could adjust for such changes in load resistance and adjust the phase selection accordingly. Such adjustments could make the power delivered to the load device a linear function of the power control value even though the load resistance is also a function of delivered power. Also, linear adjustment may compensate for the AC sinusoidal line voltage such that integration of the sine function is taken into account resulting in an essentially linear relationship between the power control value and delivered power. Yet another example of a possible enhancement is inclusion in the look-up table or in computation formulae the limits required to comply with statutory or regulatory current limits. As described above, current artifacts are affected by the amplitude of current as well as affected voltage, and micro-controller 15 can limit either by selective phase control over the 540 (plus N multiples of 180) degrees. One skilled in the art will recognize that these and similar enhancements are possible using the components described in the block diagram of FIG. 7.

While particular embodiments have been described, alternatives, modifications, variations, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed is:

1. A circuit for controlling a level of power delivered to a device, comprising:
    a zero crossing detector;
    a timing circuit;
    a combinatorial logic device that receives inputs from the zero crossing detector and the timing circuit and that generates control signals; and
    a power switch for opening and closing an output signal of the circuit in response to the control signals from the combinatorial logic device, wherein the output signal of the circuit is an alternating current waveform signal that is dropped once at a non-zero crossing point in every 540 degrees.

2. The power control circuit of claim 1, wherein the combinatorial logic device is a micro-controller.

3. The power control circuit of claim 2, wherein the micro-controller device performs the function of a plurality of functions selected from the group consisting of a zero crossing detector, cycle counter, timing circuit, voltage measuring device, and power switch.

4. The power control circuit of claim 2, further comprising a voltage measuring device for detecting voltage in a power supply line, said voltage measuring device relaying data to the micro-controller.

5. The power control circuit of claim 2, wherein the micro-controller adjusts the dropping point of the alternating current waveform signal in order to compensate for alternating current line voltage variation.

6. The power control circuit of claim 2, wherein the micro-controller adjusts the dropping point of the alternating current waveform signal in order to compensate for changes in load resistance.

7. The power control circuit of claim 2, wherein the micro-controller receives a power control value and wherein the micro-controller adjusts the dropping point of the alternating current waveform signal in order to render the delivered power essentially linearly variable with the power control value.

8. The power control circuit of claim 2, further comprising a look-up table containing data correlating different phase angles with associated levels of power.

9. The power control circuit of claim 1, wherein the combinatorial logic device receives power control value data from the device being powered.

10. The power control circuit of claim 1, further comprising a cycle counter for receiving data from the zero crossing device and for providing cycle count data to the combinatorial logic device.

11. A method for controlling levels of alternating current electrical power delivered to a device, comprising:
    sensing, with a zero crossing detector, a zero crossing point at which an alternating current voltage is zero voltage;
    counting alternating current half cycles;
    determining a phase angle that corresponds to a desired level of power within 540 degrees plus (N times 180 degrees), where N is any non-negative integer and where one phase angle corresponds to a non-zero crossing point;
    computing a time from the zero crossing point to the determined phase angle; and
    dropping the alternating current voltage at the determined phase angle once within the 540 degrees plus (N times 180 degrees).

* * * * *